Patented June 21, 1949

2,473,984

UNITED STATES PATENT OFFICE 2,473,984

FUMIGANT COMPOSITION AND METHOD

Jack M. Bickerton, New York, N. Y., assignor to Innis, Speiden and Company, New York, N. Y., a corporation of Delaware No Drawing. Application September 27, 1946, Serial No. 699,631

5 Claims. (Cl. 47—58)

This invention relates to methods and materials useful in the treatment of soil, particularly to methods and materials useful in destroying undesired nematodes and insects therein.

It has long been recognized that many benefits accrue from the proper treatment of soil which is to be used for the growing of plants. When soil is cultivated continuously, particularly when only limited crop rotation is practiced, not only do the minerals necessary for plant growth become exhausted, but deleterious species of organisms, included in what is ordinarily referred to as the soil complex, tend to increase and these lead to a gradual or even rapid decline in productivity of the soil. Such deleterious organisms, which include weeds, fungi, nematodes and insects, are not usually decreased in either numbers or vigor by fertilizers in common use. Frequently the application of such fertilizers actually favors the growth of certain undesired species.

As a result, it has become rather common practice to treat soil with chemical substances to destroy undesired and harmful organisms therein. When volatile substances are used, such practice is usually referred to as soil fumigation, the chemical substances used being referred to as soil fumigants. Among the substances which have been proposed or used as soil fumigants may be mentioned ethylene chloride, methyl bromide, carbon bisulfide, propylene chloride, chloropicrin, ethylene chlorobromide, dichlorodiethyl ether, and many others, as well as mixtures thereof. In many instances, soil fumigants are not used in pure form but are diluted with or dissolved in inert liquids to facilitate their application.

In addition to the soil fumigants mentioned above, it has been proposed to employ ethylene bromide. Ethylene bromide, 1,2-dibromoethane, has been found to be highly toxic to a wide variety of insects and nematodes inhabiting the soil. However, due to the high toxicity of the compound to many organisms and to the consequent relatively small amount which need be applied to a given amount of soil, the application of the pure substance without waste is difficult. This is more apparent when it is remembered that the usual method of fumigating soil consists in injecting or depositing a measured quantity of the fumigant at regular intervals and at a predetermined depth below the surface of the soil. The fumigant then vaporizes and the vapors permeate the soil in all directions. It is thus apparent that if the injections of fumigant into the soil are made at points separated from one another by too great a distance, an undesirably large proportion of the fumigant will escape to the atmosphere and there will be regions between the points of deposition of the fumigant in the soil in which the concentration of fumigant vapors will not be sufficiently great to be effective in destroying undesired organisms. In the case of pure ethylene bromide, for example, the product must, to secure satisfactory results, be injected into the soil at points not greater than about one foot apart and the total amount of ethylene bromide necessary for each injection is so small that its measurement and injection into the soil is difficult to carry out practically with any great degree of accuracy. Consequently, it usually happens that the amount used is either insufficient to be effective or much greater than that actually necessary. In either case the procedure is wasteful and unsatisfactory. The use of too high a dosage is undesirable for other reasons.

To overcome these difficulties, ethylene bromide has been employed mixed with such volatile substances as carbon tetrachloride or low-boiling naphtha. These have not been entirely satisfactory for a number of reasons. Carbon tetrachloride is costly, is toxic to handle, and is likely to remain for an undesirably long period of time in phytotoxic proportions in the soil. Low-boiling naphthas not only permit rapid escape of the fumigant from the soil, but are extremely hazardous to handle without danger of fire or explosion. It has not heretofore been considered feasible to use naphtha fractions, such as kerosene, having flash points above atmospheric temperature to make soil fumigant mixtures because such naphthas contain high-boiling constituents which remain in the soil for an undesirably long period of time and thus contaminate the soil so that its subsequent use for growing plants must be delayed for several days or even weeks. Furthermore, the continued use of such higher boiling petroleum fractions may lead to the eventual deposition in the soil of a harmful proportion of non-volatile oils or waxes which lower the productive capacity of the soil more or less permanently. For these and other reasons, the practice of fumigating soil prior to growing crops therein, particularly the fumigation of soil with ethylene bromide, has remained costly, and difficult and hazardous to carry out.

It is, therefore, an object of the present invention to provide a fumigant mixture free from many of the disadvantages of heretofore known mixtures.

An additional object is to provide a soil fumigant characterized by low cost and a high degree of effectiveness at temperatures at which undesired organisms in the soil are most susceptible.

An additional object is to provide a soil fumigant free from fire or explosion hazards during handling or shipping and free of harmful constituents which remain in the soil for an undesirable length of time after the fumigation has been carried out.

An additional object is to provide an improved soil fumigant mixture comprising ethylene bromide.

An additional object is to provide a method for fumigating soil characterized by a combination of advantages not heretofore known.

An additional object is to provide a method for fumigating soil characterized by its low cost, its high degree of effectiveness in killing undesired organisms in the soil and its substantial freedom from hazard to the operator during the fumigation operation.

An additional object is to provide a method for fumigating soil with ethylene bromide characterized by a high degree of devitalization of undesired soil organisms at high soil temperatures and by substantial freedom from persistent harmful residues in the soil following fumigation.

An additional object is to provide an improved composition useful in fumigating soil and a method for the utilization thereof.

In accordance with the present invention, these and related objects are accomplished readily by mixing together ethylene bromide and a fraction of petroleum naphtha selected as hereinafter set forth, in proportions such that the mixture has a flash point of 80° F. or above and boils substantially entirely below about 400° F., and fumigating the soil with the mixture.

The composition of the invention is prepared readily by mixing together ethylene bromide and the selected fraction of naphtha. It has been found that satisfactory compositions may be formed using from about 5 to about 20 per cent by volume of ethylene bromide. The naphtha employed is a carefully cut distillate boiling practically entirely below 400° F. under atmospheric pressure. In certain instances, a naphtha having from 5 to 10 per cent of a residue boiling somewhat above 400° F. upon distillation may be employed but, generally speaking, best results are obtained when the proportion of the naphtha boiling about 400° F. is held to a minimum. The flash point of the naphtha used may vary somewhat, depending upon the proportion of ethylene bromide used in the mixture. When using a larger proportion of ethylene bromide, a naphtha having a somewhat lower flash point may be used than when using a lower proportion of ethylene bromide. In no instance, however, should a combination of a low proportion of ethylene bromide and a low flash point naphtha be used which will produce a mixture having a flash point below 80° F. Preferred compositions have a flash point above 100° F. It has been noted that when using 10 per cent by volume of ethylene bromide in the mixture the flash point of the mixture is generally about 20° F. higher than the flash point of the naphtha used. This rule is by no means infallible, however, and the invention is not limited in any respect thereby.

The composition of the invention thus has the advantages of being substantially non-hazardous to handle and, due to the absence of high-boiling residues in the naphtha fraction used, of leaving substantially no undesired residues in the soil. At the same time the naphtha is sufficiently high-boiling to carry the ethylene bromide effectively through the soil in toxic concentrations and, due to the relatively slow rate of evaporation of the naphtha employed, to maintain a concentration of ethylene bromide vapor in the soil sufficiently long to render it extremely effective in very small amounts, particularly at high soil temperatures.

Fumigation of soil using the composition of the invention may be carried out readily in any one of a number of ways. Satisfactory results have been obtained by injecting or depositing measured amounts of the fumigant mixture at regular intervals beneath the surface of the soil. This may be accomplished readily by automatic machinery or by hand-operated apparatus as desired. The fumigant is usually deposited at a depth of from three to eight inches below the surface, depending upon the character, moisture content, temperature and other properties of the soil at the time of fumigation. Generally, the best results are obtained by depositing the fumigant mixture in the soil at from 8 to 12 inch intervals, although in certain instances intervals as great as 15 inches may be used if desired. The mixture is used at the rate of from 20 gallons, or somewhat less, to 55 gallons, or somewhat more, per acre. The actual amount used in any given instance will depend to some extent upon the type and condition of the soil fumigated, the proportion of ethylene bromide in the fumigant mixture and the condition of the pests to be controlled. In most instances, satisfactory results are obtained using sufficient of the mixture to provide from about 20 to about 60 pounds of ethylene bromide per acre. However, in fumigating soil containing undecomposed plant material containing galls of the root-knot nematode, it is frequently advisable to use sufficient of the mixture to provide as much as 75 pounds or more of ethylene bromide per acre.

Following the fumigation, seeds may be planted and plants grown in the soil in normal manner. Soil, which has been fumigated using the herein disclosed composition and method, has been found to be substantially free from nematodes such as root-knot nematode, meadow nematode, golden nematode, and sugar-beet nematode, and from wireworms, symphylids, and many other soil pests. Root-knot nematode galls on undecayed plant material are penetrated readily by the fumigant and the organism devitalized.

Certain advantages of the invention are apparent from the following examples which are given by way of illustration only and are not to be construed as limiting.

EXAMPLE 1

A fumigant mixture was prepared by mixing together ten per cent by volume of ethylene bromide and 90 per cent by volume of a commercial cut of petroleum naphtha, known as mineral spirits, and having the following specifications:

Flash point_____ 105° F. (TCC)
Specific gravity at 60° F_____ 0.782
Minimum boiling point_____ 307° F.
Maximum boiling point_____ 385° F.

The fumigant mixture thus obtained boiled entirely below 400° F., had a specific gravity of 0.921 at 77° F. and a flash point of 125° F. and was effective in killing nematodes and many species of insect pests in soil.

EXAMPLE 2

A fumigant mixture was prepared by mixing together 10 per cent by volume of ethylene bromide and 90 per cent of a petroleum fraction referred to in the trade as Stoddard solvent. The naphtha fraction used had the following specifications:

| | |
|---|---|
| Flash point | 116° F. (TCC) |
| Specific gravity at 60° F | 0.795 |
| Minimum boiling point | 326° F. |
| Maximum boiling point | 400° F. |

The resulting fumigant mixture had a flash point of about 135° F., and boiled entirely below 400° F. The mixture was used satisfactorily in fumigating soil to kill numerous species of nematodes and insects therein.

EXAMPLE 3

Several one-half gallon crocks were filled with soil with which roots bearing galls due to the root-knot nematode, had been mixed 18 days previously. A mixture of one part by volume of ethylene bromide and nine parts of a petroleum naphtha, boiling entirely between 300° and 400° F. was prepared. The mixture had a flash point of 125° F. and boiled entirely below 400° F. One series of crocks was fumigated by injecting 0.2 milliliter of the fumigant mixture 3 and ½ inches below the surface of the soil in the center of each crock. Other series were fumigated using different dosages of the mixture. One series was left unfumigated and one series was treated with naphtha alone for comparative purposes. Four squash seeds were planted in each crock on the tenth day following the fumigation. The squash seed grew vigorously in each crock and the plants were examined 24 days after planting. The average number of galls per crock in each series was determined. These values, together with the dosage in milliliters per crock and the calculated dosage in gallons per acre, are given in the accompanying Table I.

Table I

| Amt of Fumigant per crock, Milliliters | Calc. Amt. of Fumigant, Gal. per acre | Av. No. of Galls per Crock |
|---|---|---|
| 0 (control) | | 716 |
| 0.2 | 15.3 | 46 |
| 0.3 | 22.95 | 39.6 |
| 0.4 | 30.6 | 3.3 |
| 0.5 | 38.25 | 6.6 |
| 0.6 | 45.90 | 1.3 |
| 0.8 | 61.22 | 1.3 |
| 1.0 | 76.5 | 0.3 |
| 0.5 (naphtha alone) | | 897.3 |
| 1.0 (naphtha alone) | | 610.0 |

EXAMPLE 4

The mixture as prepared in Example 2 was used in fumigating soil in one-half gallon crocks substantially as by the method in Example 3. When using 1.5 milliliters of fumigant per crock, the average number of galls observed on the roots of plants growing in each crock was 1.3. When using 1.0 milliliters of fumigant mixture per crock, the average number of galls on the roots in each crock was 4.3. The average number of galls on the roots of plants grown similarly in an unfumigated crock was 183.3.

EXAMPLE 5

Several one-gallon crocks were filled with soil and fumigated with a fumigant mixture (A), prepared as in Example 1, by injecting 1.1 milliliters of the fumigant mixture into the soil at the center of the crock 3½ inches below the surface. This was calculated to be at the rate of a dosage of 51.5 gallons of fumigant per acre. Fifty radish seeds were planted in each of several of the crocks immediately after the fumigant had been introduced, fifty radish seeds were planted in several other of the crocks four days after fumigation and in still others of the crocks seven days after fumigation. A number of crocks which had not been fumigated were also planted each time with fifty radish seeds each for comparative purposes. The determination was repeated using a fumigant mixture (B), prepared as in Example 2. Each of the crocks was observed several days after planting and the average number of healthy radish plants growing in the crocks planted at the same time were noted and given in the accompanying Table 2.

Table 2

| Days Between Fumigation and Planting | Aver. Number Healthy Plants per Crock | | |
|---|---|---|---|
| | Not Fumigated | Fumigated with (A) | Fumigated with (B) |
| 0 | 33 | 26 | 33 |
| 4 | 30 | 20 | 23 |
| 7 | 23 | 27 | 31 |

EXAMPLE 6

Eight plots of soil each 20 by 30 inches in area were laid off in an open field. Buffer strips, 18 inches wide, were left between the plots. Each of the plots was then seeded with 200 radish and 100 barley seeds. Fumigant mixtures, A and B, prepared as in Examples 1 and 2, respectively, were then used for fumigating separate series of plots by injecting the fumigant into staggered holes in each of the plots ten inches apart and five inches deep at the rate of 1.5 milliliters per hole. This is equivalent to a rate of 25.4 gallons of fumigant mixture per acre. The average number of healthy radish and barley plants growing after six days in each plot receiving a given treatment is recorded in the accompanying Table 3. The average number of healthy plants growing in unfumigated plots are also given for comparative purposes.

Table 3

| Fumigant | Radish | Barley |
|---|---|---|
| None | 135 | 82 |
| A | 122 | 80 |
| B | 126 | 77 |

I claim:
1. A fumigant composition comprising ethylene bromide and naphtha and having a flash point above about 80° Fahrenheit and not more than about 10 per cent by volume of a residue boiling above about 400° Fahrenheit upon distillation.

2. A composition as claimed in claim 1 wherein the flash point is above about 100° Fahrenheit.

3. A fumigant composition comprising naphtha and from about 5 to about 20 per cent by volume of ethylene bromide characterized by having a flash point above about 100° Fahrenheit and not more than about 10 per cent by volume of a residue boiling above about 400° Fahrenheit upon distillation.

4. The method for fumigating soil which includes depositing below the surface of the soil a mixture of ethylene bromide and naphtha having a flash point above about 80° Fahrenheit and not more than about 10 per cent by volume of a fraction boiling above about 400° Fahrenheit.

5. The method of claim 4 wherein the fumigant composition has a flash point above about 100° Fahrenheit.

JACK M. BICKERTON.

REFERENCES CITED

The following references are of record in the file of this patent:

UNITED STATES PATENTS

| Number | Name | Date |
| --- | --- | --- |
| 1,940,899 | Badertscher | Dec. 26, 1933 |
| 2,013,028 | Buc | Sept. 3, 1935 |
| 2,059,125 | Lyons | Oct. 27, 1936 |
| 2,133,972 | Coleman | Oct. 25, 1938 |
| 2,448,265 | Kagy | Aug. 31, 1948 |

FOREIGN PATENTS

| Number | Country | Date |
| --- | --- | --- |
| 318,898 | Great Britain | Dec. 11, 1930 |
| 449,210 | Great Britain | June 23, 1936 |